Patented Oct. 27, 1942

2,299,862

UNITED STATES PATENT OFFICE 2,299,862

PREPARATION OF VINYL ESTERS

Walter J. Toussaint, South Charleston, and Louis G. MacDowell, Jr., Charleston, W. Va., assignors to Carbide and Carbon Chemicals Corporation, a corporation of New York No Drawing. Application November 18, 1939, Serial No. 305,106

8 Claims. (Cl. 260—410)

The invention relates to a process for producing vinyl esters, in particular the vinyl esters of carboxylic acids containing at least three carbon atoms.

The preparation of vinyl acetate can be readily effected by reaction of acetylene with acetic acid in the presence of a suitable catalyst. These initial reactants are relatively inexpensive, and the process is one comparatively easy to control. It is more difficult, however, to produce other vinyl esters in this manner, particularly those of many higher carboxylic acids which do not so readily react with acetylene under usual conditions. The high cost of some of these acids is also prohibitive to the commercial production of the esters by the previously known processes.

It is an object of this invention to provide an improved process for making those vinyl esters which have heretofore been difficult or costly to prepare. A further object is to produce more efficiently and economically vinyl esters from carboxylic acids containing three or more carbon atoms in the molecule.

In accordance with the invention an exchange reaction is employed, in which a readily available and comparatively cheap vinyl ester is heated with the carboxylic acid whose ester derivative is desired. Vinyl acetate is particularly suited as the ester starting product, and a catalyst is employed, preferably consisting of a mercury salt of a strong acid. The essential reaction accomplished may be represented by the following formula:

in which R₁COO represents the radical of a lower fatty acid, preferably acetic acid, and R₂COO denotes the radical of a carboxylic acid containing three or more carbon atoms. A substantial excess of the ester over the acid is desirable for the best conversions, and vinyl acetate is preferably used in the ratio of at least about six mols of the ester to one mol of the carboxylic acid. The reaction can be carried out at normal room temperatures with acceptable yields of the desired ester, but the reaction rate is improved at higher temperatures. Heating is, therefore, preferable with an upper temperature limit not substantially higher than the boiling point of the lowest boiling constituent of the reaction, which will usually be the vinyl acetate or other starting ester.

The presence of a catalyst is essential, and mercury salts of a strong acid, as heretofore used in vinyl ester formation from acetylene, are satisfactory. For the best results, the catalyst is prepared directly in the reaction solution by initially introducing mercuric acetate, which is then converted to the required salt by addition of a strong acid. Depending in part on the particular catalyst-forming acid used, it may be of advantage to add less of the acid than is required to form the normal mercury salt, and as little as half of this quantity has been used successfully. At the same time an excess of the acid may in some instances be desirable. Representative catalyst-forming acids are sulfuric acid and phosphoric acid, as well as silicotungstic acid, boron trifluoride-carboxylic acid, and other heteropoly acids. Hydrochloric acid may also be appropriate in some reactions, but does not now appear to be as effective as the other acids mentioned. Only very small amounts of the catalyst are required, less than 2% of mercuric acetate, based on the carboxylic acid reactant, being usually sufficient. As little as 0.125% of mercuric acetate, with an equivalent amount of sulfuric acid, has been found sufficient to catalyze some of the reactions of this invention.

A large variety of vinyl esters have been prepared by this process with practical and economical yields, including esters of the acids 2-ethyl butyric, 2-ethyl hexoic, propionic, oleic, abietic, crotonic, lauric, 2-ethyl crotonic, benzoic, glycolic and salicylic. The esters of acids obtainable from linseed, cotton seed and soya bean oils have also been made in good yields, and it appears that any carboxylic acids having solubility in the reaction mixture will produce vinyl esters by the reaction specified.

The following examples are further illustrative of the invention, indicating certain embodiments of the procedure:

Example 1

Four grams of mercuric acetate was dissolved in a solution of 400 grams of vinyl acetate and 200 grams of distilled oleic acid, and about 0.3 cc. of 100% sulfuric acid was then carefully added. The mixture was heated at the boiling point for three and a half hours. After neutralizing the inorganic acid with sodium acetate, the mixture was filtered and distilled under reduced pressure. Vinyl oleate, distilling at 165° to 175° C. at 2 to 2.5 mm. pressure, was obtained in an amount of 124 grams.

Example 2

To a solution of 288 grams of 2-ethyl hexoic acid and 1,020 grams of vinyl acetate there was added 4 grams of mercuric acetate, and, subsequently, 0.6 cc. of concentrated sulfuric acid. The mixture was heated at 80° C. for 2 hours, the inorganic acid then neutralized with sodium acetate, and the crude mixture distilled. Vinyl 2-ethyl hexoate was obtained with an efficiency from hexoic acid of 90%, with an overall yield of 73%.

Example 3

Fifteen hundred ten grams of a product known by the trade-name "Neo Fat 3," consisting of a mixture of commercial fatty acids, particularly oleic and linoleic acids, was mixed with 2800 grams of vinyl acetate. To this there was added 30 grams of mercuric acetate and then 30 grams of silicotungstic acid dissolved in 110 cc. of acetone. The mixture was heated for five hours at 50° C. with stirring. Twenty-four grams of calcium acetate was then added and the mixture was filtered and distilled. The distillate containing the higher vinyl esters was fractionated, and 951 grams of the higher esters, containing about 2.7% of fatty acids, was obtained.

Example 4

To 148 grams of propionic acid and 258 grams of vinyl acetate, 2 grams of mercuric acetate and about 0.55 gram of sulfuric acid was added. The mixture was heated at the boiling point (80° to 85° C.) for one hour. Sodium acetate was added to neutralize the catalyst, and the mixture was then distilled at atmospheric pressure, yielding 100 grams of vinyl propionate boiling at 90° to 95° C.

Example 5

To a mixture of 6 mols of vinyl acetate and 1 mol of benzoic acid there was added, to form the catalyst, 1.6% of mercuric acetate based on the benzoic acid, and sulfuric acid equivalent to the mercuric acetate. The reaction mixture was heated 3 hours at 78° C., 2 grams of sodium acetate was added, and the vinyl benzoate isolated by distillation. A 73% overall yield of vinyl benzoate was obtained.

The above examples are merely illustrative, and should not be considered as limiting the invention, as many modifications in reaction constituents, and details of procedure, will be obvious to those skilled in the art. Vinyl acetate is the preferred, and probably most readily available, initial ester reactant, but the use of other starting esters is not excluded if they are economically procurable. All these modifications are included within the scope of the invention as defined in the appended claims.

We claim:

1. Process for making vinyl esters from carboxylic acids having at least three carbon atoms which comprises heating an excess of vinyl acetate with said carboxylic acid in the presence of catalytic amounts of a mercury salt of a strong acid, and distilling the reaction mixture to recover the vinyl ester product.

2. Process for making vinyl esters from carboxylic acids having at least three carbon atoms which comprises heating vinyl acetate with said carboxylic acid, in molar proportions of at least six mols of the esters to one mol of the acid, in the presence of catalytic amounts of a mercury salt of a strong acid and distilling the reaction mixture to recover the vinyl ester product.

3. Process for making vinyl esters from carboxylic acids having at least three carbon atoms which comprises heating vinyl acetate with said carboxylic acid, in molar proportions of about six mols of the ester to one mol of the acid, in the presence of a mercury salt catalyst formed in the reaction liquid by addition thereto of mercuric acetate and a strong acid, and distilling the reaction mixture to recover the vinyl ester product.

4. Process for making vinyl esters from carboxylic acids having at least three carbon atoms which comprises heating vinyl acetate with said carboxylic acid, in molar proportions of about six mols of the ester to one mol of the acid, in the presence of a catalyst of mercuric sulfate formed in the reaction liquid by the addition thereto of mercuric acetate and sulfuric acid, and distilling the reaction mixture to recover the vinyl ester product.

5. Process for making vinyl esters from carboxylic acids having at least three carbon atoms which comprises heating vinyl acetate with said carboxylic acid, in molar proportions of about six mols of the ester to one mol of the acid, in the presence of a catalyst of mercuric sulfate formed in the reaction liquid by the addition thereto of mercuric acetate and sulfuric acid, neutralizing the catalyst in the reaction mixture, and isolating the vinyl ester formed by distillation.

6. Process for making vinyl propionate which comprises heating vinyl acetate with propionic acid, in molar proportions of about six mols of the ester to one mol of the acid, in the presence of a catalyst of mercuric sulfate formed in the reaction liquid by the addition thereto of mercuric acetate and sulfuric acid, neutralizing the catalyst in the reaction mixture, and isolating the vinyl propionate by distillation.

7. Process for making vinyl oleate which comprises heating vinyl acetate with oleic acid, in molar proportions of about six mols of the ester to one mol of the acid, in the presence of a catalyst of mercuric sulfate formed in the reaction liquid by the addition thereto of mercuric acetate and sulfuric acid, neutralizing the catalyst in the reaction mixture, and isolating the vinyl oleate by distillation.

8. Process for making vinyl benzoate which comprises heating vinyl acetate with benzoic acid, in molar proportions of about six mols of the ester to one mol of the acid, in the presence of a catalyst of mercuric sulfate formed in the reaction liquid by the addition thereto of mercuric acetate and sulfuric acid, neutralizing the catalyst in the reaction mixture, and isolating the vinyl benzoate by distillation.

WALTER J. TOUSSAINT.
LOUIS G. MacDOWELL, Jr.